United States Patent [19]

Dias Magalhães Queiroz

[11] Patent Number: 5,632,473
[45] Date of Patent: May 27, 1997

[54] ELASTIC SPRING AND SPRING SUPPORT FOR MATTRESS, CHAIR OR UPHOLSTERY

[76] Inventor: João Dias Magalhães Queiroz, Quinta das Salinas- Darque, P-4900 Viana do Castelo, Portugal

[21] Appl. No.: 244,576
[22] PCT Filed: Sep. 29, 1993
[86] PCT No.: PCT/PT93/00005
    § 371 Date: Aug. 1, 1994
    § 102(e) Date: Aug. 1, 1994
[87] PCT Pub. No.: WO94/07395
    PCT Pub. Date: Apr. 14, 1994

[30] Foreign Application Priority Data

Oct. 1, 1992 [PT] Portugal ............... 100923

[51] Int. Cl.$^6$ ............... A47C 23/02; F16F 1/20
[52] U.S. Cl. ............... 267/164; 5/247; 5/769; 297/452.15; 267/103
[58] Field of Search ............... 267/103, 104, 267/109, 160, 164, 131, 142, 294, 80, 98, 101; 5/247, 262, 476, 249, 255, 400, 461, 468; 248/632, 634, 636, 638, 626; 297/452.44, 452.49, 452.52, 452.54, 452.15

[56] References Cited

U.S. PATENT DOCUMENTS

| 118,385 | 8/1871 | Newman | 267/142 |
|---|---|---|---|
| 122,111 | 12/1871 | Duffy | 5/255 |
| 576,013 | 1/1897 | Weedin | 248/626 |
| 1,734,776 | 11/1929 | Pallenberg | 248/626 |
| 1,791,237 | 2/1931 | Edelson et al. | 5/476 |
| 1,837,828 | 12/1931 | Newman et al. | 5/476 |
| 1,837,847 | 12/1931 | Bowersox | 5/247 |
| 2,277,853 | 3/1942 | Kohn | 5/476 |
| 2,291,389 | 7/1942 | Krakauer | 5/262 |
| 2,313,171 | 3/1943 | Piliero | 5/247 |
| 2,433,012 | 12/1947 | Zalieovitz | 5/476 |
| 2,979,739 | 4/1961 | Krakauer | 5/247 |
| 3,638,254 | 2/1972 | Falkenau | 5/476 |
| 3,879,025 | 4/1975 | Dillard | 267/165 |
| 4,100,631 | 7/1978 | Slone | 5/247 |
| 4,502,731 | 3/1985 | Snider | 297/452.15 |
| 5,426,799 | 6/1995 | Ottiger et al. | 5/476 |

FOREIGN PATENT DOCUMENTS

| 0001469 | 4/1979 | European Pat. Off. . |
|---|---|---|
| 0089789 | 9/1983 | European Pat. Off. . |
| 2015659 | 10/1970 | Germany . |
| 8502589 | 4/1987 | Netherlands . |

*Primary Examiner*—Robert J. Oberleitner
*Assistant Examiner*—Chris Schwartz

[57] ABSTRACT

An elastic framework for a mattress, chair, upholstery, etc. is disclosed which includes elastic springs made of opposing upper and lower elastic elements, each elastic element having a base portion and a plurality of flexible arms which extend from the base portion and are joined to the flexible arms of the opposing upper or lower element so as to form a closed flexible ring. These flexible rings are joined to top support elements and bottom support elements at the base portion of the upper and lower elastic elements, respectively, and the top support elements as well as the bottom supported elements are respectively interconnected so as to form a spring support.

6 Claims, 8 Drawing Sheets

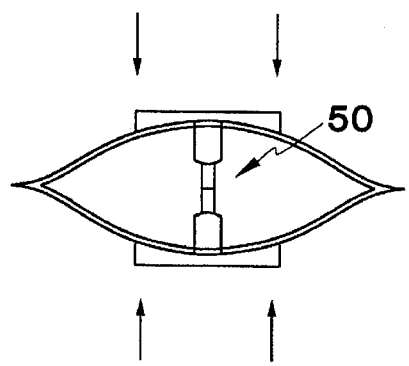
FIG. 5a
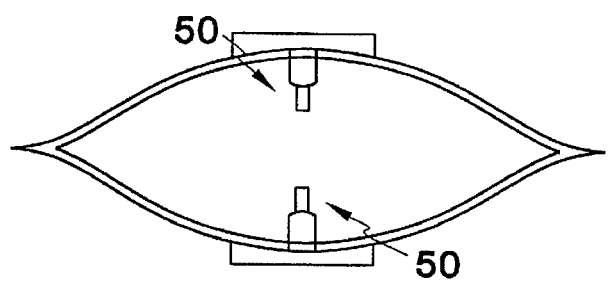
FIG. 5b
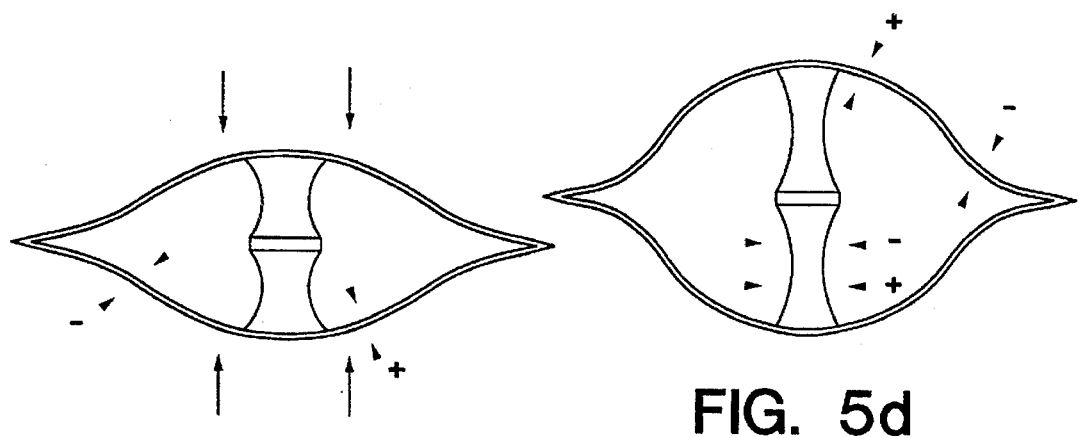
FIG. 5c
FIG. 5d
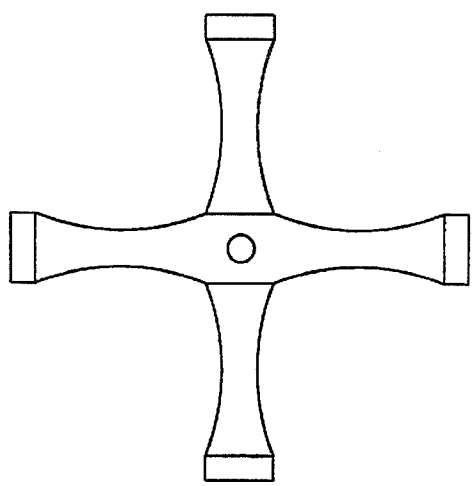
FIG. 5e

FIG. 6a
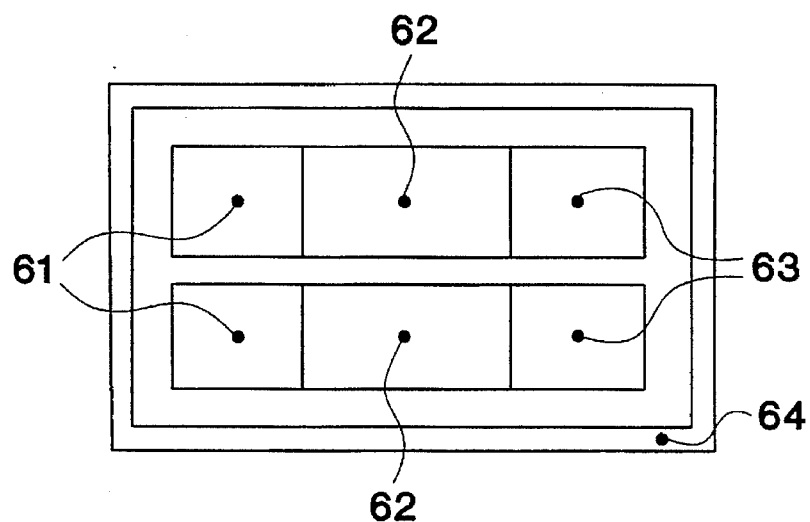
FIG. 6b
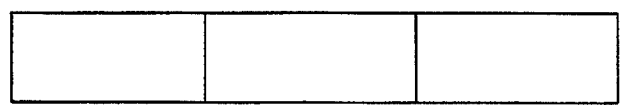
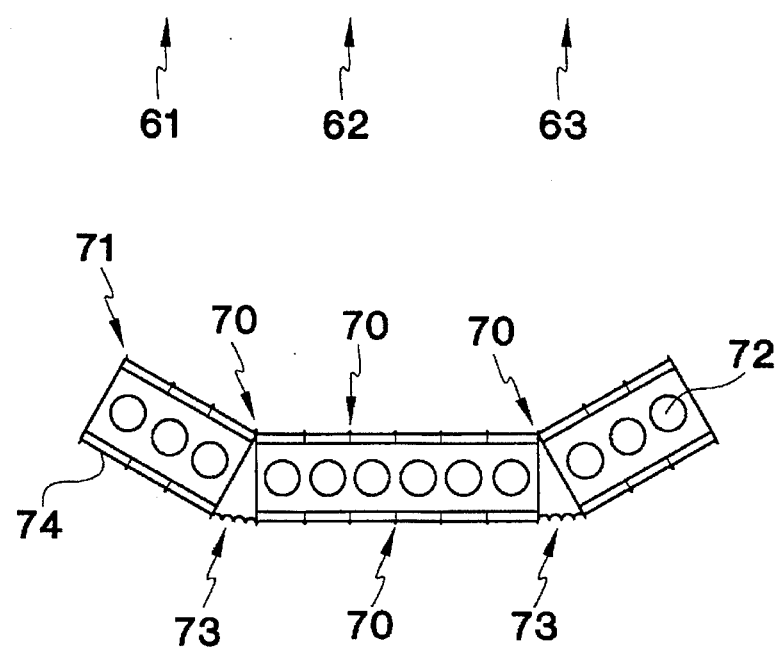
FIG. 7

ELASTIC SPRING AND SPRING SUPPORT FOR MATTRESS, CHAIR OR UPHOLSTERY

BACKGROUND OF THE INVENTION

1. Field of the Invention

The present invention relates to an elastic framework for a mattress, or upholstery. The elastic framework is efficient, non-expensive lightweight, non-degradable by oxidation and easy to manufacture.

2. Description of the Background Art

Metallic springs have been used many years in the manufacture of mattress, chairs, upholstery, etc., without much evolution. Their manufacture, in steel wire becomes complex because of their automatic coiling by expensive machinery and their further need of tempering the steel. The automatic machinery that perform these two operations cost considerable amounts today and are accessible only to large companies. Also, interconnecting these springs manually to form the framework of a mattress or chair is complex, slow and expensive, because the process requires plenty of labor or very high cost automatic machinery.

Further, a framework of springs is heavy, noisy and subject to oxidation. In the manufacture of a mattress based on a framework of metallic springs, there exists a problem with a difficult solution. A padded lining must be placed next to the springs so that the person using the mattress does not feel the hardness and irregularity of the wires that make up the framework.

SUMMARY OF THE INVENTION

The basic foundation of a mattress, chair, etc., is its framework, making the unit homogeneous, solid and elastic to support the human body.

In the present invention the elastic spring elements are made in a convenient shape and size and manufactured of injected plastic, in molds. The resilience, flexibility and strength will be identical to a conventional spring made of steel wire. Different kinds of material utilized in the injection will give different characteristics, i.e., more or less flexibility to the spring, from the same mould.

The elastic spring elements are interconnected by means which fit together and form a superior and inferior lid which are interconnected by interdependent means. These independent means form a complete framework with two plane surfaces, which may be perforated for economy of material or to allow ventilation.

BRIEF DESCRIPTION OF THE DRAWINGS

FIG. 1b is a section view of the elastic spring element taken along line I—I of FIG. 1a.

FIGS. 5a and 5b show an elastic spring element according to a second embodiment of the present invention under load and no-load, respectively, wherein the elastic spring element is connected to upper and lower support elements which include stoppers to limit the compression of the spring when excessive loads are applied;

FIGS. 5c and 5d show an elastic combination spring, formed of two elastic spring elements of the second embodiment of the present invention, under load and no-load, respectively;

FIG. 5e is a top view of the elastic combination spring shown in FIGS. 5c–5d;

FIGS. 5j to 5i illustrate three elastic conbination springs made from four, three, and two rings, respectively, as seen in elevation.

FIGS. 6a and 6b show a top view and side view, respectively, of a mattress loading condition;

FIG. 7 shows a side view of a mattress that is made to have either the head or foot area elevated.

DETAILED DESCRIPTION

Figure 1A:
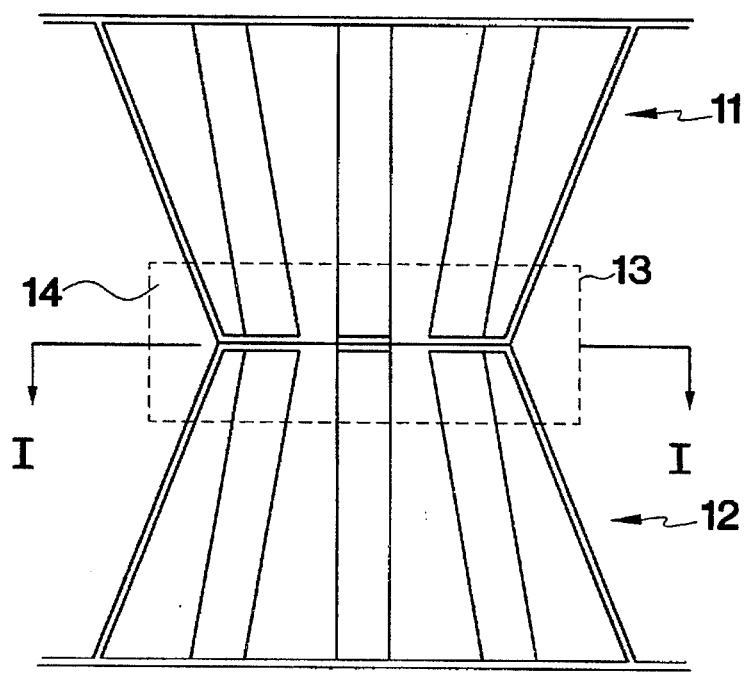
FIG. 1a is a top side view of a first embodiment of elastic spring element according to the present invention.
Figure 1B:
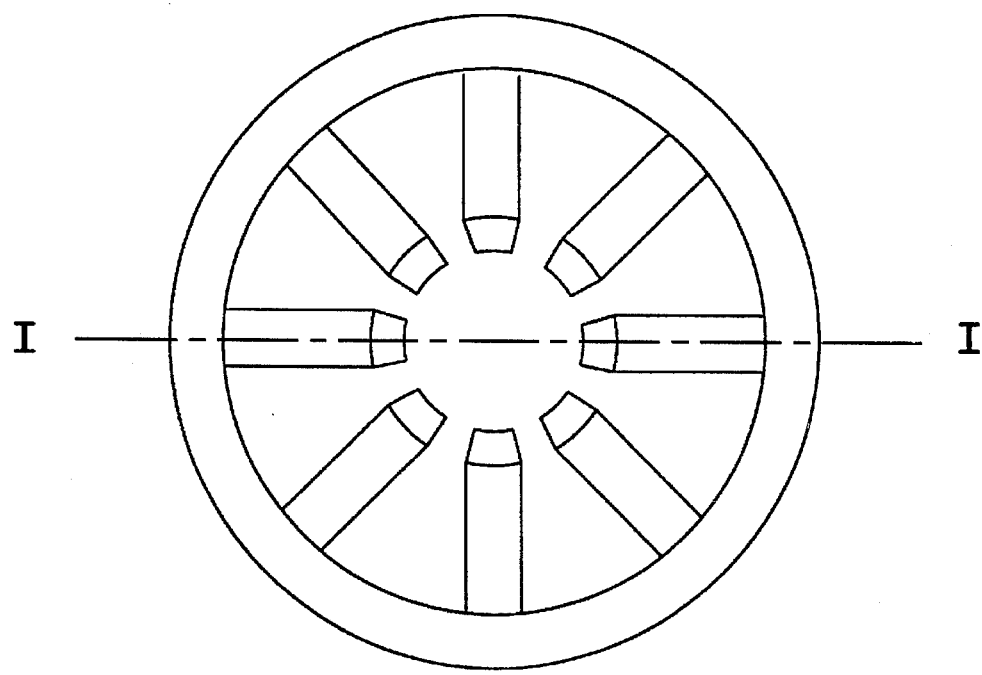

The present invention will be described as follows according to preferred embodiments. Each elastic spring element as shown in FIG. 1a is made of two equal components, 11 and 12. Each of the components 11 and 12 are manufactured by injection molding of plastic materials.

To configure a complete elastic spring element 10, the components 11 and 12 are secured together in the fastening zone 14 by ultra sound welds, glue or by any other process so as to form a ring which closes upon itself. The zone 13 shall be the place where the spring element 10 will basically flex whenever a load is exercised on the elastic spring element 10.

Figure 2:
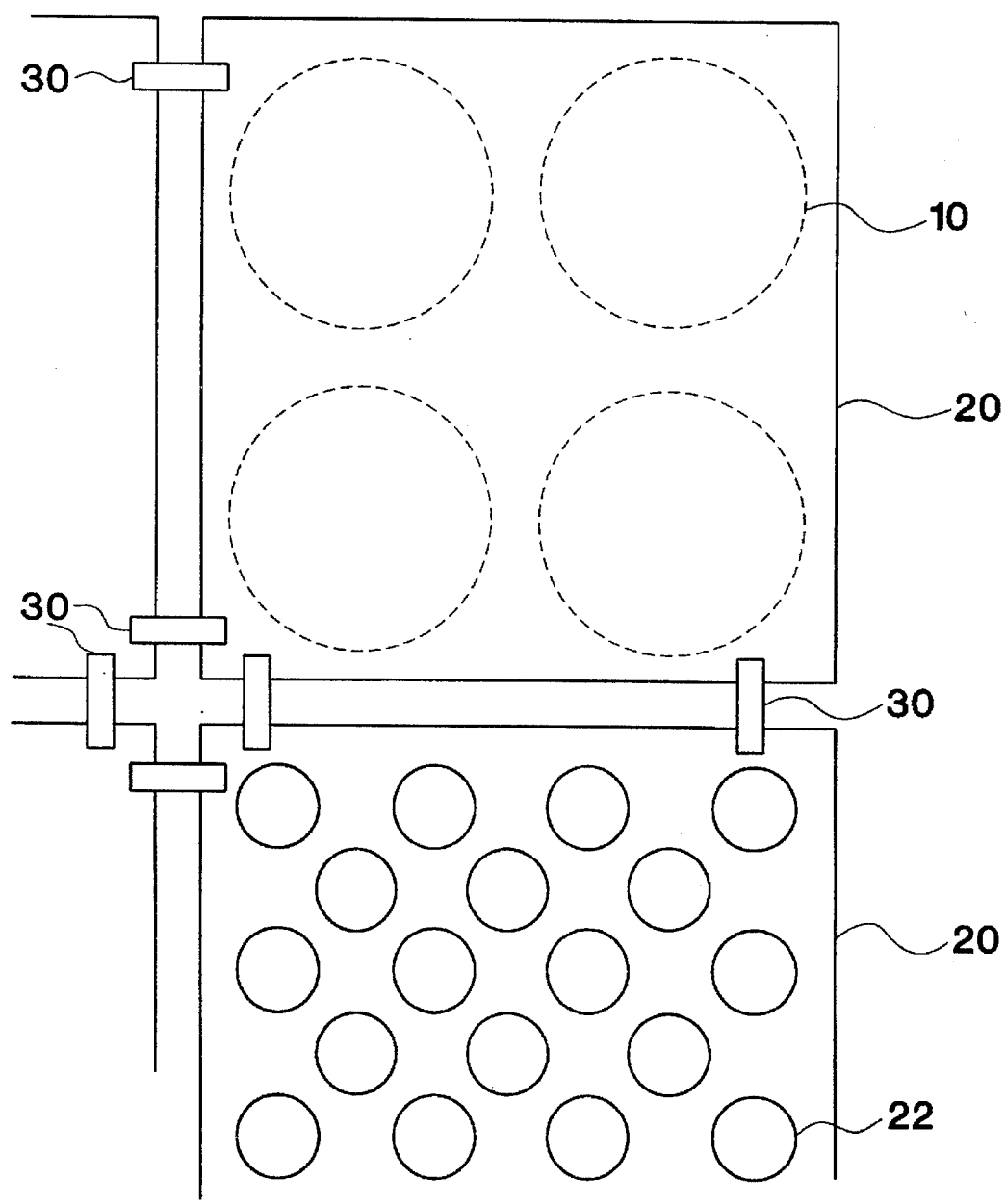
FIG. 2 is a top view of the elastic spring elements of the invention in combination with support elements.
Figure 3:
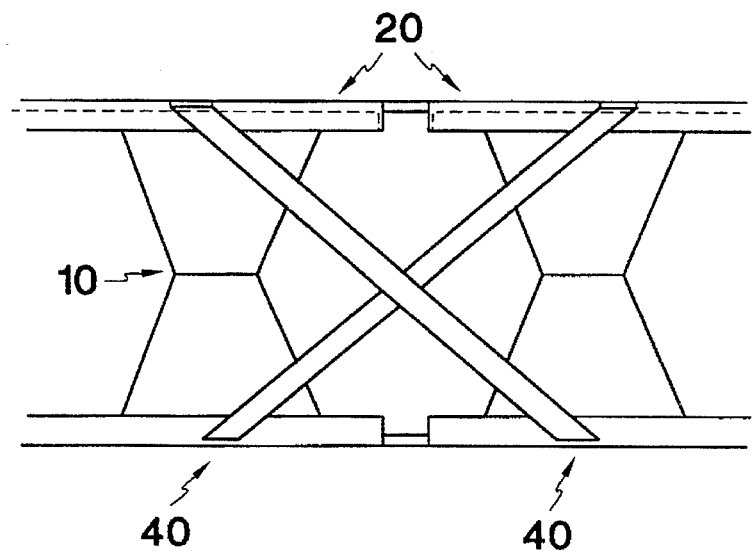
FIG. 3 is a side view of a frame of a mattress according to the present invention showing bracing to prevent a sideways motion between the top support elements and the bottom support elements.
Figure 4:
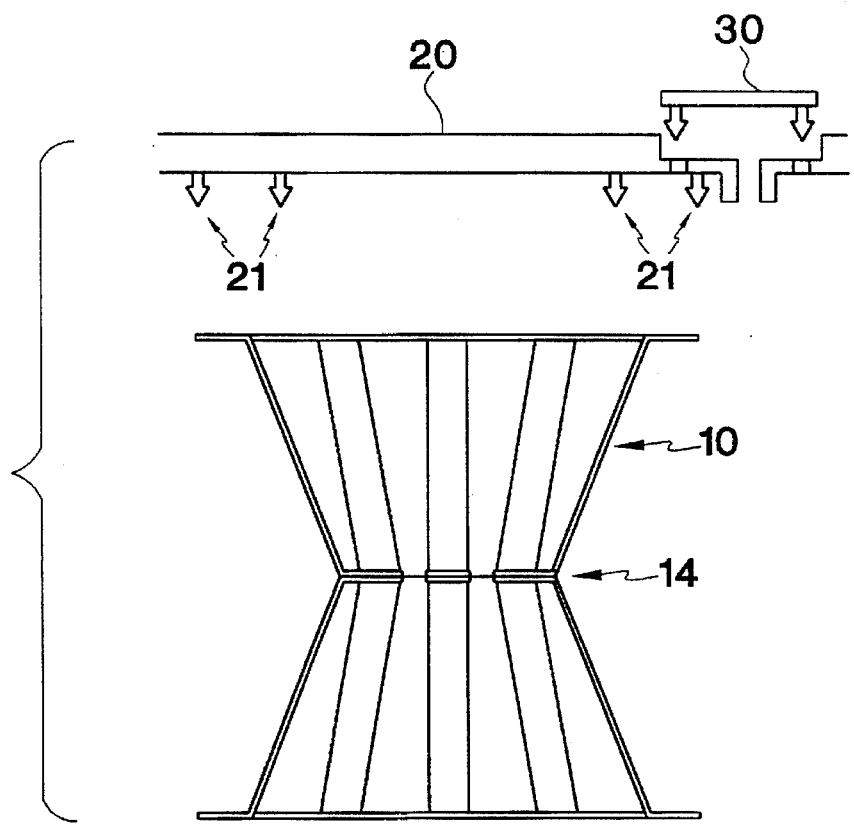
FIG. 4 illustrates how the support elements are connected to the elastic spring elements.

As shown in FIGS. 2–4, in a first embodiment of the invention, the interconnection and support of the elastic elements is made through support element 20. FIG. 2 shows 4 elastic spring elements 10 covered by one support element 20.

The elastic spring elements 10 are adjoined to the support element 20. Pins 21 join the elastic spring elements 10 and the support element 20 on the upper surface, as well as the elastic spring element and another support element 20 on the lower surface. Interconnecting members 30 couple the various support elements 20 together in order to configure a complete framework of, for example, a mattress, as illustrated in FIG. 3.

The interconnecting elements 30, besides being joined by the pins 21 as shown, may also be ultra-sound welded or glued.

In FIG. 3, bracing elements 40 function to brace and reinforce the edges of the support elements 20 that make up the framework. These bracing elements 40 are formed from injected plastic which can support exceptional loads, as for example, someone sitting on the edge of the mattress.

Support elements 20 could also have its surface perforated with holes 22, as shown in FIG. 2, not only to economize on material but also to allow air circulation between the framework and the elements that might be placed over them to make a mattress, as for example: felts, cotton, wool material, etc.

FIG. 4 shows support elements 20, holding pins 21 that fit irreversibly to hold an elastic spring element of the first embodiment having a welding zone at 14.

FIGS. 5a and 5b show, for a second embodiment of elastic spring element, the use of restrictors or stoppers 50, under a load and no-load condition, respectively, which are integrated with the support element 20 for limiting further movement, of upper and lower flexible arms which extend from a base portion when the load reaches its permissible top value. As shown in FIG. 5a, the stoppers limit the amount of compression forces exerted on the spring by preventing compression of the spring beyond a maximum value.

FIGS. 5c and 5d show side views of a combination elastic spring using two spring elements according to the second embodiment of the invention, but without the upper and lower support elements and stoppers, under a load and no-load condition, respectively, wherein the width of the arms may be varied in the vertical direction and the thickness of the elastic arms may be varied (as illustrated by the + and − signs) to control the resilience of the rings.

FIG. 5e shows a top view of the elastic spring element shown in FIGS. 5c and 5d, respectively.

Figure 5F:
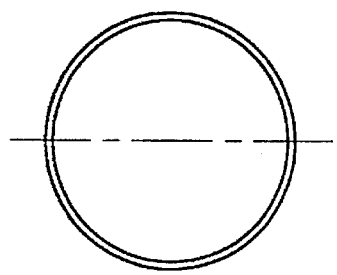
FIGS. 5f and 5g illustrate front and end views, respectively, of a spring according to a third embodiment of the invention which employs a closed ring, of constant width and thickness to form an elastic spring.
Figure 5G:
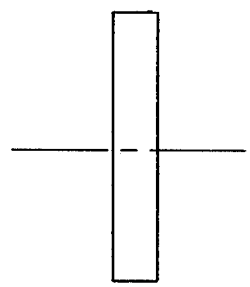

FIGS. 5f and 5g illustrate front and end views, respectively, of the third embodiment of the invention which employs a closed ring of constant width and thickness.

Figure 5H:
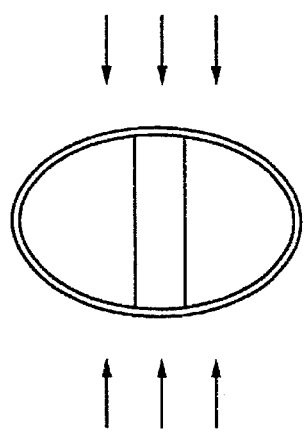
FIGS. 5h and 5i illustrate an elastic combination spring formed of two closed rings fabricated as illustrated when under load and no load, respectively.
Figure 5I:
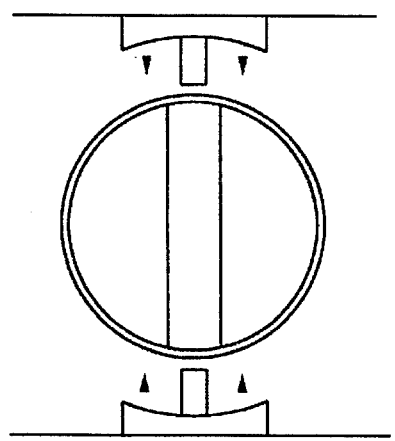

FIGS. 5h and 5i illustrate an elastic spring formed of two closed rings when under load and no load, respectively.

Figure 5J:
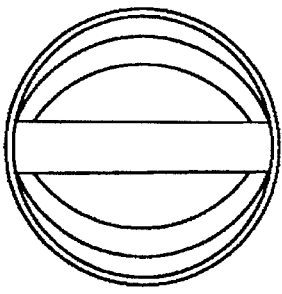
Figure 5K:
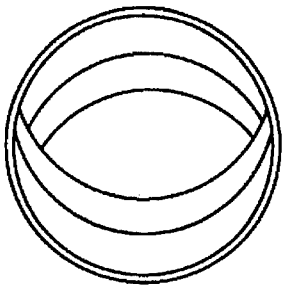
Figure 5L:
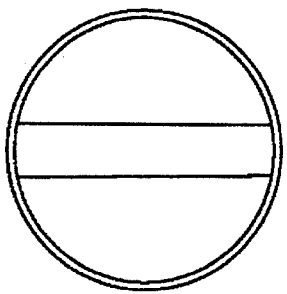
Figure 5M:
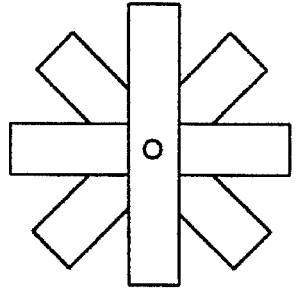
FIGS. 5m to 5o illustrate the same three elastic combination springs, respectively, as seen in plan view.
Figure 5N:
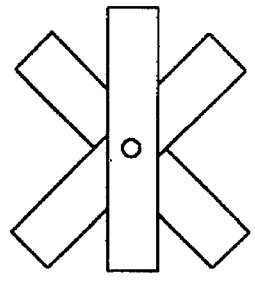
Figure 5O:
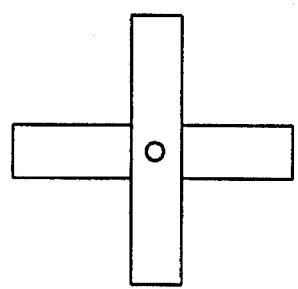

FIGS. 5j to 5l illustrate three elastic combination springs made from four, three, and two rings, respectively, as seen in plan view.

FIG. 6A and 6B show top and side views, respectively, of a mattress illustrating its typical loading condition when in use, wherein:

61 is the "head" area where there is very little weight or load;

62 is the "trunk and lip" area where the heaviest load occurs, concentrating between 70 and 75% of the body weight.

63 is the "leg" area where there is relatively little weight applied; and 64 is the "periphery of the mattress" area which is subject to great loads, but only momentarily, when a person is getting in or out of bed.

FIG. 7 shows a side view of a mattress that is made to have either the head or foot area elevated, wherein 70 illustrates means of interlinking the upper support means, that function like a hinge;

71 illustrates the upper support means where the elastic elements are fixed;

72 illustrates the elastic elements;

73 illustrates means for interlinking the lower elastic and flexible support means to allow the raising of end sectors of the mattresses only at locations where the mattress is made to flex in angle; and, 74 illustrates means of lower support linked by interlinking means 70 in all their unions except in the angle opening lines where the means for interlinking 73 allow the mattress to flex in angle.

Figure 8:
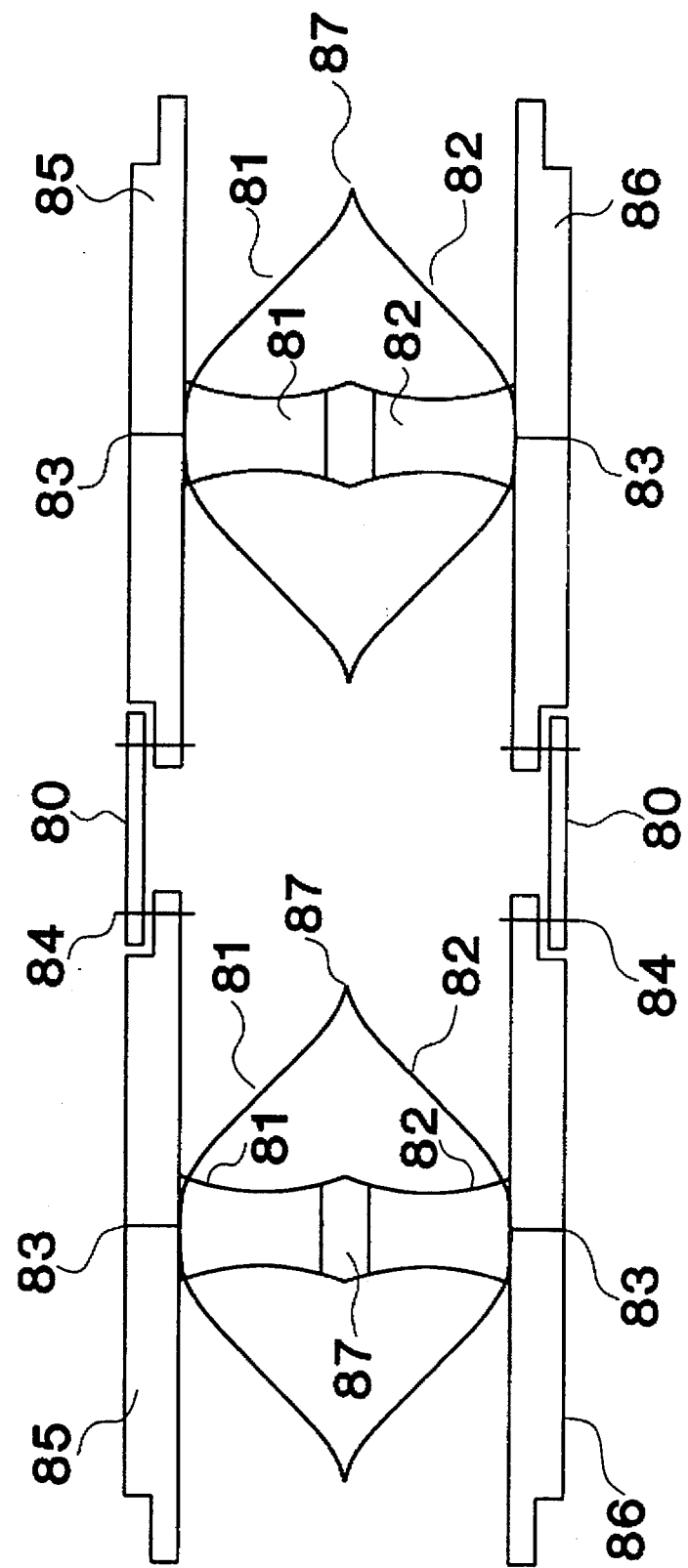
FIG. 8 illustrates spring elements of the second embodiment of the invention used in conjunction with a plurality of top support elements and a plurality of bottom support elements with interconnection structure for connecting the top support elements together and for connecting the bottom support elements together.

FIG. 8 shows a side view of the two component springs, each having an upper arch 81 and a lower arch 82 joined at flattened ends 87. The springs are fixed to upper and lower support elements 85,86 by attachment means 83, such as by pins. Adjacent upper support elements are joined by interconnection members 80 by using pins 84 or glue. Similarly, adjacent lower support elements 86 are joined by interconnection members 80 by using pins 84 or glue.

Although the invention referred to hereby specifically refers to a mattress, chair, etc., it will be possible for a person skilled in the art to make alterations or other applications, without departing from the scope of the present invention which is only limited by the following claims.

I claim:

1. An elastic spring, comprising:

upper and lower elastic elements, each made of plastic and including a base portion integral with two flexible arms, said arms varying in width and thickness along their length and extending in opposite directions to form an arch with flattened ends; and connecting means for connecting each flexible arm of said upper elastic element to a respective flexible arm of said lower elastic element at said flattened ends so as to form two opposed arches having flattened ends that are connected.

2. The elastic spring according to claim 1 and further comprising an additional one or more identical elastic springs positioned so that the base of each elastic spring is aligned on a single common axis, with the arms of each elastic spring extending in different azimuthal directions, to thereby form a combination spring.

3. The combination spring according to claim 2, wherein there is further provided a stopper to limit the maximum compression of the combination elastic spring.

4. A spring support comprising:

a plurality of springs, each including upper and lower elastic elements, each elastic element made of plastic and including a base portion integral with two flexible arms, said arms varying in width and thickness along their length and extending in opposite directions from the base portion to form an arch with flattened ends; and connecting means for connecting each flexible arm of said upper elastic element to a respective flexible arm of said lower elastic element at said flattened ends so as to form two opposed arches having flattened ends that are connected;

a plurality of top support elements;

a plurality of bottom support elements;

each of said springs being connected to one of said plurality of top support elements and to one of said bottom support elements; and interconnecting means for connecting said top support elements together and for connecting said bottom support elements together.

5. The spring support according to claim 4, and further comprising holes in either said top or said bottom support elements to thereby reduce the weight of said support elements.

6. The spring support according to claim 4 and further comprising bracing means for connecting said top support elements to said bottom support elements so as to prevent a sideways motion between said top support elements and said bottom support elements.

* * * * *